No. 782,792. PATENTED FEB. 14, 1905.
P. N. MOORE.
FRICTION SPRING DRAFT RIGGING.
APPLICATION FILED SEPT. 8, 1904.
2 SHEETS—SHEET 1.
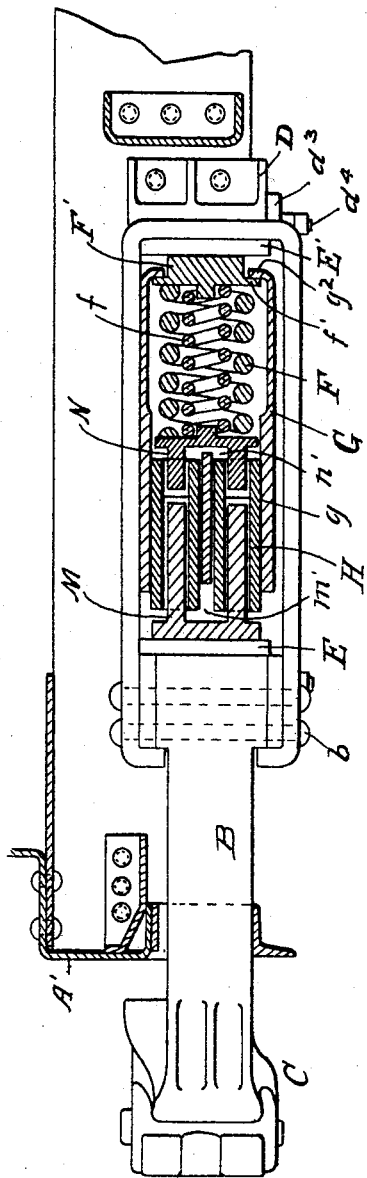
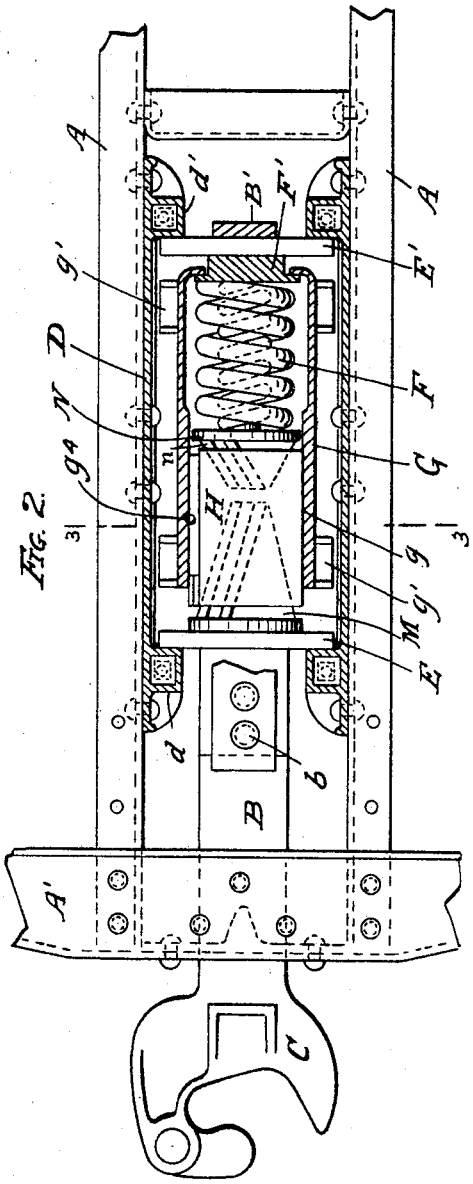
WITNESSES:
F. B. Townsend
Wm. Geiger
INVENTOR.
Peter N. Moore
BY Munday Evarts
& Adcock
his ATTORNEYS

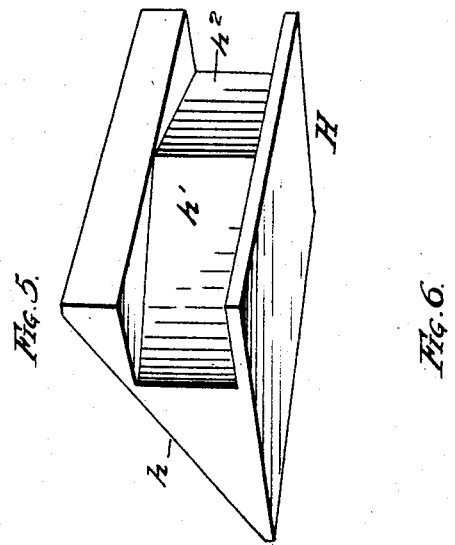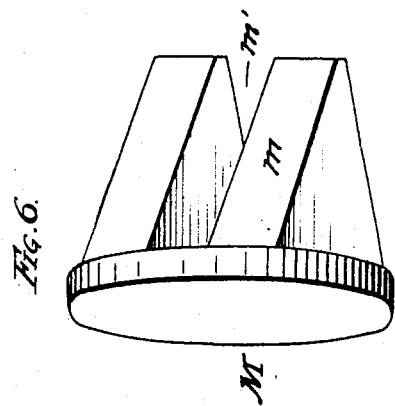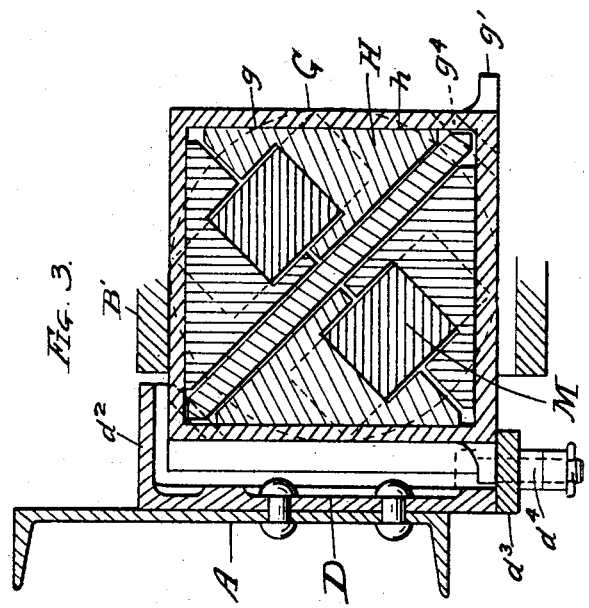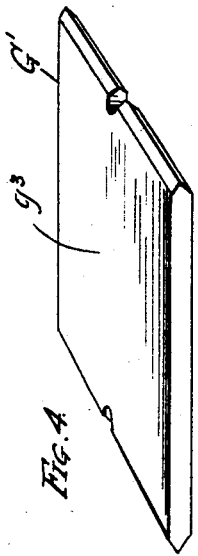

No. 782,792.

Patented February 14, 1905.

UNITED STATES PATENT OFFICE.

PETER N. MOORE, OF MILWAUKEE, WISCONSIN.

FRICTION SPRING DRAFT-RIGGING.

SPECIFICATION forming part of Letters Patent No. 782,792, dated February 14, 1905.

Application filed September 8, 1904. Serial No. 223,718.

*To all whom it may concern:*

Be it known that I, PETER N. MOORE, a citizen of the United States, residing in Milwaukee, in the county of Milwaukee and State of Wisconsin, have invented a new and useful Improvement in Friction Spring Draft-Rigging, of which the following is a specification.

My invention relates to improvements in friction spring draft-rigging for railway-cars.

The object of my invention is to provide a friction spring draft-rigging of a simple, strong, efficient, and durable construction which will exert a great frictional resistance in connection with a direct-acting spring resistance longitudinally arranged in the line of draft.

My invention consists, in connection with the draw-bar, draw-bar strap or extension, side plates or stop-castings, longitudinally-arranged spring and followers, of a sliding friction-shell provided with a friction division-plate dividing it or the friction portion thereof into compartments, a plurality of sliding friction-blocks in each compartment of the sliding friction-shell, and wedge blocks or caps for spreading the sliding friction-blocks and causing them to frictionally engage the friction-shell and its division-plate.

My invention also consists in the novel construction of parts and devices and in the novel combinations of parts and devices herein shown or described.

In the accompanying drawings, forming a part of this specification, Figure 1 is a central vertical longitudinal section of a friction spring draft-rigging embodying my invention. Fig. 2 is a horizontal section. Fig. 3 is a partial cross-section on line 3 3 of Fig. 2. Fig. 4 is a detail perspective view of the division-plate. Fig. 5 is a perspective view of one of the sliding friction-blocks in each compartment of the shell, and Fig. 6 is a detail perspective view of one of the wedge caps or blocks.

In the drawings, A represents the draft-sills or center sills of a car; A', the front or cross sill; C, the coupler; B, the draw-bar; B', the draw-bar extension or strap secured to the coupler draw-bar by bolts or rivets $b$.

D D are the side plates or stop-castings having a front stop $d$ and rear stop $d'$ for the followers E E' to abut against and upper guides $d^2$ and lower guides $d^3$ for the followers to reciprocate on or between. The lower guides $d^3$ are in the form of separate removable plates secured to the side plates or stop-castings D by a bolt $d^4$ to enable the draft-rigging to be removed and replaced.

F is a longitudinally-arranged direct-acting spring, there being also preferably a small spring $f$ nesting within it.

F' is a spring seat-block interposed between the rear end of the spring and the rear follower E'.

G is a sliding friction-shell preferably square or rectangular in cross-section and having an interior friction-surface $g$. The sliding friction-shell G is provided with feet or projections $g'$ to rest and slide upon the lower guide $d^3$ of the side plates or stop-castings D and with an internal shoulder or flange $g^2$ at its rear end engaging a shoulder or flange $f'$ on the seat-block F' to cause the sliding friction-shell G to return to position when the spring F expands after being compressed. The spring seat-block F' also permits an initial compression of the spring F both in pulling and buffing before the rear follower engages the rear end of the friction-shell G.

G' is a friction division-plate mounted, preferably, diagonally in the friction-shell G and dividing the same into two triangular friction compartments or chambers.

H H are a pair of sliding friction-blocks mounted to slide in each of the friction chambers or compartments of the friction-shell and having friction-faces $h$, adapted to frictionally engage the friction-faces $g$ of the friction-shell G and the friction-surface $g^3$ of the division-plate G'. Each of these sliding friction-blocks H is also furnished with oppositely-directed wedge faces or inclines $h'$ $h^2$, which are engaged by the wedge faces or inclines $m$ $n$ of the wedge-blocks or wedge-caps M N. The front wedge cap or block M bears against or receives pressure from the front follower E, and the rear wedge block or cap N abuts against or receives pressure from the spring F. The wedge-cap M has a slot or open space $m'$ to receive the division-plate G', and the wedge-cap N has a corresponding slot or open space $n'$. The friction division-plate G' is removably secured in the friction-shell G by pins $g^4$, extending through the adjacent corners of the friction-shell G.

The operation is as follows: In buffing, the front follower, wedge-cap M, and sliding friction-blocks H move with the draw-bar, while the rear follower and the friction-shell G and division-plate G' are held stationary after the initial compression of the spring F has taken place, thus causing a powerful frictional resistance to be produced between the sliding friction-blocks and the friction-shell and its division-plate. In pulling, the operation is the same but the reverse, the front follower now being held stationary and the rear follower, friction-shell, and its division-plate moving with the draw-bar after the initial compression of the spring F.

I claim—

1. In a friction spring draft-rigging, the combination with the draw-bar, draw-bar extension, side plates or stop-castings, direct-acting spring and followers, of a sliding friction-shell having an interior friction-surface, a friction division-plate dividing the friction-shell into friction chambers or compartments, a plurality of sliding friction-blocks in each chamber or compartment of said friction-shell, having friction-surfaces in sliding frictional engagement with the friction-surfaces of the shell and its division-plate, and provided with wedge faces or inclines, and wedge caps or blocks, substantially as specified.

2. In a friction spring draft-rigging, the combination with the draw-bar, draw-bar extension, side plates or stop-castings, direct-acting spring and followers, of a sliding friction-shell having an interior friction-surface, a friction division-plate dividing the friction-shell into friction chambers or compartments, a plurality of sliding friction-blocks in each chamber or compartment of said friction-shell, having friction-surfaces in sliding frictional engagement with the friction-surfaces of the shell and its division-plate, and provided with wedge faces or inclines, and wedge caps or blocks, said wedge caps or blocks having slots or open spaces to receive said division-plate, substantially as specified.

3. In a friction spring draft-rigging, the combination with the draw-bar, draw-bar extension, side plates or stop-castings, direct-acting spring and followers, of a sliding friction-shell having an interior friction-surface, a friction division-plate dividing the friction-shell into friction chambers or compartments, a plurality of sliding friction-blocks in each chamber or compartment of said friction-shell, having friction-surfaces in sliding frictional engagement with the friction-surfaces of the shell and its division-plate, and provided with wedge faces or inclines and wedge caps or blocks, and a spring seat-block interposed between said friction-shell and one of the followers, substantially as specified.

4. In a friction spring draft-rigging, the combination with a longitudinally-arranged spring and followers, of a sliding friction-shell, a friction division-plate inside the shell dividing it into friction chambers or compartments, and a plurality of sliding friction-blocks in each friction chamber or compartment of the shell, substantially as specified.

5. In a friction spring draft-rigging, the combination with a longitudinally-arranged spring and followers, of a sliding friction-shell, a friction division-plate inside the shell dividing it into friction chambers or compartments, and a plurality of sliding friction-blocks in each friction chamber or compartment of the shell, and a wedge block or cap for forcing the friction-blocks into frictional engagement with the friction-surfaces of the shell and division-plate, substantially as specified.

6. In a friction spring draft-rigging, the combination with a longitudinally-arranged spring and followers, of a sliding friction-shell, a friction division-plate inside the shell dividing it into friction chambers or compartments, and a plurality of sliding friction-blocks in each friction chamber or compartment of the shell, and a wedge block or cap for forcing the friction-blocks into frictional engagement with the friction-surfaces of the shell and division-plate, and a seat-block interposed between the spring and one of the followers, substantially as specified.

7. In a friction spring draft-rigging, the combination with a longitudinally-arranged spring and followers, of a rectangular sliding friction-shell, a division-plate extending diagonally across the shell and dividing it into two triangular friction-chambers and triangular sliding friction-blocks in each of said chambers, substantially as specified.

8. In a friction spring draft-rigging, the combination with a longitudinally-arranged spring and followers, of a rectangular sliding friction-shell, a division-plate extending diagonally across the shell and dividing it into two triangular friction-chambers and triangular sliding friction-blocks in each of said chambers, provided with wedge faces or inclines, substantially as specified.

9. In a friction spring draft-rigging, the combination with a longitudinally-arranged spring and followers, of a rectangular sliding friction-shell, a division-plate extending diagonally across the shell and dividing it into two triangular friction-chambers and triangular sliding friction-blocks in each of said chambers, provided with wedge faces or inclines, and a wedge block or cap engaging the wedge faces or inclines of said sliding friction-blocks, substantially as specified.

10. In a friction spring draft-rigging, the combination with a longitudinally-arranged spring and followers, of a rectangular sliding friction-shell, a division-plate extending diagonally across the shell and dividing it into two triangular friction-chambers and triangular sliding friction-blocks in each of said chambers, provided with wedge faces or inclines, and a wedge block or cap engaging the wedge faces or inclines of said sliding friction-blocks, and a seat-block interposed between the spring and one of the followers, substantially as specified.

11. In a friction spring draft-rigging, the combination with a longitudinally-arranged spring and followers, of a rectangular sliding friction-shell, a division-plate dividing it into triangular chambers, triangular sliding friction-blocks in each of said chambers, furnished with wedge faces or inclines and wedge blocks or caps at each end of said sliding friction-blocks, substantially as specified.

12. In a friction spring draft-rigging, the combination with a longitudinally-arranged spring and followers, of a rectangular sliding friction-shell, a division-plate dividing it into triangular chambers, triangular sliding friction-blocks in each of said chambers, furnished with wedge faces or inclines and wedge blocks or caps at each end of said sliding friction-blocks, and a spring-seat interposed between the spring and one of the followers and provided with a shoulder engaging a shoulder on said sliding friction-shell, substantially as specified.

PETER N. MOORE.

Witnesses:
   PEARL ABRAMS,
   WILLIAM A. GEIGER.